United States Patent
Asano et al.

(10) Patent No.: US 12,412,889 B2
(45) Date of Patent: *Sep. 9, 2025

(54) NEGATIVE ELECTRODE MATERIAL FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Taisuke Asano, Hyogo Ken (JP); Yohei Uchiyama, Hyogo Ken (JP); Yosuke Sato, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 704 days.

This patent is subject to a terminal disclaimer.

(21) Appl. No.: 17/630,656

(22) PCT Filed: Jul. 21, 2020

(86) PCT No.: PCT/JP2020/028211
§ 371 (c)(1),
(2) Date: Jan. 27, 2022

(87) PCT Pub. No.: WO2021/020226
PCT Pub. Date: Feb. 4, 2021

(65) Prior Publication Data
US 2022/0263066 A1     Aug. 18, 2022

(30) Foreign Application Priority Data
Jul. 31, 2019  (JP) .................. 2019-141664

(51) Int. Cl.
*H01M 4/36* (2006.01)
*H01M 4/38* (2006.01)
(Continued)

(52) U.S. Cl.
CPC .......... *H01M 4/364* (2013.01); *H01M 4/386* (2013.01); *H01M 4/5825* (2013.01); *H01M 2004/027* (2013.01)

(58) Field of Classification Search
CPC .... H01M 4/364; H01M 4/386; H01M 4/5825; H01M 2004/027
(Continued)

(56) References Cited

U.S. PATENT DOCUMENTS 11,271,197 B2 *   3/2022  Asano ................ H01M 4/386
2009/0162750 A1   6/2009  Kawakami et al.
(Continued)

FOREIGN PATENT DOCUMENTS

CN      105849953 A     8/2016
CN      107408682 A    11/2017
(Continued)

OTHER PUBLICATIONS

Extended (Supplementary) European Search Report dated Aug. 18, 2022, issued in counterpart EP application No. 20846399.2. (7 pages).
(Continued)

*Primary Examiner* — Nicholas A Smith
*Assistant Examiner* — Kevin Nguyen
(74) *Attorney, Agent, or Firm* — WHDA, LLP

(57) ABSTRACT

A negative electrode material for a non-aqueous electrolyte secondary battery, including a silicate phase, silicon particles dispersed in the silicate phase, and a crystal phase dispersed in the silicate phase. The silicate phase contains at least one element E1 selected from the group consisting of
(Continued)

alkali metal elements and Group 2 elements. The crystal phase contains a rare earth element, silicon, and oxygen.

11 Claims, 2 Drawing Sheets

(51) Int. Cl.
   *H01M 4/58* (2010.01)
   *H01M 4/02* (2006.01)
(58) Field of Classification Search
   USPC .................................................... 429/231.6
   See application file for complete search history.

(56) References Cited

U.S. PATENT DOCUMENTS

| | | | |
|---|---|---|---|
| 2012/0258370 A1 | 10/2012 | Miyoshi et al. | |
| 2013/0052529 A1 | 2/2013 | Ohkubo et al. | |
| 2014/0110639 A1* | 4/2014 | Yamamura | H01M 4/386 252/519.1 |
| 2015/0079471 A1 | 3/2015 | Fang et al. | |
| 2015/0325839 A1 | 11/2015 | Put et al. | |
| 2016/0322637 A1 | 11/2016 | Nakanishi et al. | |
| 2016/0372753 A1* | 12/2016 | Fukasawa | H01M 10/052 |
| 2017/0214041 A1 | 7/2017 | Minami et al. | |
| 2017/0309950 A1 | 10/2017 | Minami et al. | |
| 2019/0319261 A1 | 10/2019 | Uchiyama et al. | |
| 2020/0321611 A1 | 10/2020 | Uchiyama et al. | |
| 2020/0350563 A1 | 11/2020 | Uchiyama et al. | |
| 2020/0365879 A1 | 11/2020 | Yamamoto et al. | |
| 2021/0066716 A1 | 3/2021 | Uchiyama et al. | |
| 2021/0202930 A1 | 7/2021 | Yamamoto et al. | |

FOREIGN PATENT DOCUMENTS

| | | |
|---|---|---|
| CN | 110024188 A | 7/2019 |
| JP | 8-208333 A | 8/1996 |
| JP | 2007-59213 A | 3/2007 |
| JP | 2009-164104 A | 7/2009 |
| JP | 2013-184862 A | 9/2013 |
| JP | 2014-107013 A | 6/2014 |
| JP | 2014-199753 A | 10/2014 |
| JP | 2014-220216 A | 11/2014 |
| JP | 2015-69753 A | 4/2015 |
| JP | 2016-507859 A | 3/2016 |
| JP | 2017-024931 A | 2/2017 |
| WO | 2011/077654 A1 | 6/2011 |
| WO | 2016/035290 A1 | 3/2016 |
| WO | 2019/065766 A1 | 4/2019 |
| WO | 2019/130787 A1 | 7/2019 |
| WO | 2019/131724 A1 | 7/2019 |

OTHER PUBLICATIONS

International Search Report dated Oct. 20, 2020, issued in counterpart International Application No. PCT/JP2020/028211 (2 pages).
Office Action dated Oct. 28, 2023, issued in counterpart CN application No. 202080054372.6, with English partial translation. (10 pages).

* cited by examiner

NEGATIVE ELECTRODE MATERIAL FOR NONAQUEOUS ELECTROLYTE SECONDARY BATTERIES, AND NONAQUEOUS ELECTROLYTE SECONDARY BATTERY

TECHNICAL FIELD

The present invention mainly relates to an improvement of a negative electrode of a non-aqueous electrolyte secondary battery.

BACKGROUND ART

Non-aqueous electrolyte secondary batteries, particularly lithium ion secondary batteries, because of their high voltage and high energy density, have been expected as promising power sources for small consumer applications, power storage devices, and electric vehicles. With increasing demand for a higher battery energy density, a material containing silicon (Si) that forms an alloy with lithium has been expected to be utilized as a negative electrode active material having a high theoretical capacity density.

Patent Literature 1 proposes, in a non-aqueous electrolyte secondary battery, to include a negative electrode active material comprising a lithium silicate phase represented by $Li_{2z}SiO_{2+z}$ ($0<z<2$) and silicon particles dispersed in the lithium silicate phase.

CITATION LIST

Patent Literature

[PTL 1] WO 2016/35290

SUMMARY OF INVENTION

The negative electrode active material as disclosed in Patent Literature 1 has a small irreversible capacity associated with charge and discharge, as compared to a composite material ($SiO_x$) in which fine silicon is dispersed in $SiO_2$ phase, and is advantageous in improving the initial charge and discharge efficiency.

However, with development of more sophisticated portable electronic devices and the like, further improvement in the initial charge and discharge efficiency has been required.

In view of the above, one aspect of the present invention relates to a negative electrode material for a non-aqueous electrolyte secondary battery, including: a silicate phase; silicon particles dispersed in the silicate phase; and a crystal phase dispersed in the silicate phase, the silicate phase containing at least one element E1 selected from the group consisting of alkali metal elements and Group 2 elements, the crystal phase containing a rare earth element, silicon, and oxygen.

Another aspect of the present invention relates to a non-aqueous electrolyte secondary battery, including: a positive electrode; a negative electrode; and a non-aqueous electrolyte, the negative electrode including the above-described negative electrode material of a non-aqueous electrolyte secondary battery.

According to the present invention, the initial charge and discharge efficiency of a non-aqueous electrolyte secondary battery can be improved.

DESCRIPTION OF EMBODIMENTS

Figure 1:
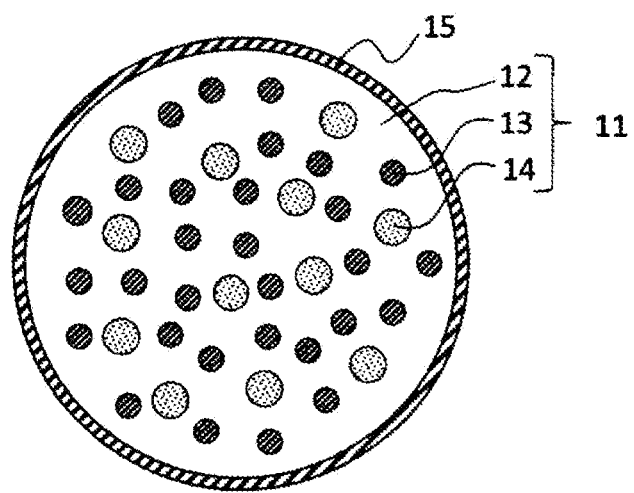
FIG. 1 A schematic cross-sectional view of a negative electrode material according to an embodiment of the present invention.

[Negative electrode material for non-aqueous electrolyte secondary battery] A negative electrode material (hereinafter sometimes referred to as a composite material) for a non-aqueous electrolyte secondary battery according to an embodiment of the present invention includes a silicate phase containing an element E1 (sometimes simply referred to as a silicate phase), and silicon particles dispersed in the silicate phase. The element E1 is at least one selected from the group consisting of alkali metal elements and Group 2 elements. In the silicate phase, a crystal phase containing a rare earth element, silicon (Si), and oxygen (O) (sometimes simply referred to as a crystal phase) is also dispersed.

By allowing a crystal phase whose reactivity with lithium ions is low to be dispersed in the matrix of the silicate phase, the number of sites that may react with the lithium ions in the silicate phase are decreased, resulting in a reduced irreversible capacity, and an enhanced the initial charge and discharge efficiency. To disperse the crystal phase in the matrix of the silicate phase, a crystal phase may be formed in the silicate phase in the production process of the negative electrode material. This can more efficiently decrease the sites that may react with the lithium ions.

When a crystal phase containing a rare earth element, silicon and oxygen is dispersed in the matrix of the silicate phase containing the element E1, the initial charge and discharge efficiency is significantly improved. Although the detailed reason is not clear, this is presumably because the crystal phase containing a rare earth element, silicon and oxygen is particularly low in reactivity with lithium ions and hardly absorbs lithium ions, which can considerably suppress the side reaction in the initial stage of charge and discharge, and thus can remarkably improve the initial charge and discharge efficiency.

The crystal phase is formed of a silicate of the rare earth element with high crystallinity. When the crystallinity of the silicate of the rare earth element is high, in an X-ray diffraction pattern of the composite material obtained by X-ray diffractometry using Cu-Kα radiation, a diffraction peak having a half-width of 0.75° or less is observed around, for example, a diffraction angle 2θ=33°.

A higher crystallinity of the silicate of the rare earth element is more desirable. In this case, the reactivity with ions, such as lithium ions, of the crystal phase is further reduced, and in addition, the lithium ion conductivity is improved. As a result, the resistance during discharge is reduced, and the initial charge and discharge efficiency tends to improve.

In the present specification, the half-width means a full width at half maximum (FWHM). In the present specification, with regard to the angle at which a diffraction peak is observed, "around D°" means that the angle is in the range of above (D−0.5°) and below (D+0.5°).

In the composite material, the content of the rare earth element is, relative to the total mass of the elements other than oxygen, preferably 0.2 mass % or more and 21 mass % or less, more preferably 2.4 mass % or more and 15 mass % or less, and further more preferably 5.5 mass % or more and 14 mass % or less. When the content of the rare earth element in the composite material is 0.2 mass % or more, relative to the total mass of the elements other than oxygen, the initial charge and discharge efficiency can be more effectively improved. When the content of the rare earth element in the composite material is 21 mass % or less, relative to the total mass of the elements other than oxygen, sufficient amount of the silicate phase of the element E1 tends to be ensured in the composite material. When the silicate phase of the element E1 with low crystallinity is sufficiently present in the composite material, the lithium ion conductivity tends to increase in the composite material, and the stress associated with expansion and contraction of the silicon particles tends to be reduced.

The content of the rare earth element in the composite material can be obtained, for example, as follows.

The battery is dismantled, to take out the negative electrode, which is then washed with a non-aqueous solvent, such as ethylene carbonate, and dried. This is followed by processing with a cross section polisher (CP) to obtain a cross section of the negative electrode material mixture layer, thereby to obtain a sample. A field emission scanning electron microscope (FE-SEM) is used to give a reflected electron image of a sample cross section, to observe the cross section of a composite material particle. Then, an Auger electron spectroscopy (AES) analyzer (JAMP-9510F, available from JEOL Corporation) is used to perform a qualitative/quantitative analysis of elements for a certain area around the center of the observed cross section of the composite material particle (acceleration voltage: 10 kV, beam current: 10 nA, analysis area: 20 µmϕ). On the basis of the result of the analysis, the content of the rare earth element in the composite material particle (the ratio of the mass of the rare earth element to the total mass of the elements other than oxygen contained in the composite material particle) is determined. The observed 10 composite material particles are analyzed to obtain an average of the rare earth element contents.

The rare earth element preferably includes at least one selected from the group consisting of lanthanum (La), cerium (Ce), praseodymium (Pr), and neodymium (Nd). In view of improving the lithium ion conductivity, the rare earth element particularly preferably contains La. The proportion of La in the rare earth element as a whole is preferably 90 at % or more and 100 at % or less.

The crystal phase can have a composition represented by, for example, a general formula: $M_2O_3 \cdot ySiO_2$, where y is, for example, 1.0 to 2.0, and M is a rare earth element. The crystal phase preferably contains a compound A represented by a general formula: $M_2Si_2O_7$, where M is a rare earth element, because it is highly stable in structure and is unlikely to leach out into the electrolyte solution. In particular, $La_2Si_2O_7$ is more preferable because it can stably present without changing its structure even during charge and discharge. When the crystal phase contains the compound A represented by $M_2Si_2O_7$, where M is a rare earth element, the crystal phase has a crystal structure including at least one selected from the group consisting of monoclinic, tetragonal, and triclinic crystal structures.

That the crystal phase containing a rare earth element, silicon and oxygen is dispersed in the matrix of the silicate phase of the element E1 can be confirmed by observing a cross-sectional image (reflected electron image) of the composite material obtained using a scanning electron microscope (SEM) or a transmission electron microscope (TEM). The crystal phase dispersed in the silicate phase has an equivalent circle diameter of, for example, 10 nm or more and 1 µm or less. The equivalent circle diameter of the crystal phase can be determined from a cross-sectional image (reflected electron image) of the composite material obtained using a SEM or TEM. Specifically, it can be determined by converting the areas of 100 crystal phases into the equivalent circle diameters, and averaging them.

The crystal phase containing a rare earth element, silicon and oxygen can be confirmed by an X-ray diffractometry using Cu-Kα radiation. For example, when the crystal phase of the compound A is dispersed in the silicate phase, a diffraction peak attributed to the compound A is observed around a diffraction angle 2θ=26°. 27°. 28°, and 33° in the X-ray diffraction pattern of the composite material.

The crystal phase containing a rare earth element, silicon and oxygen may also be confirmed by electron beam diffraction measurement using a field emission transmission electron microscope (JEM2100F, available from JEOL Corporation, acceleration voltage: 200 kV, acceleration current: 110 pA). On the basis of the data of a diffraction point (the distance from the center point) obtained by electron beam diffractometry, the interplanar spacing attributed to the compound A and the crystal structure can be obtained. The composition of the crystal phase can be identified on the basis of the obtained interplanar spacing and crystal structure and the elements contained in the crystal phase obtained by energy dispersive X-ray analysis (EDX).

When the silicon particles and the crystal phase of the compound A are dispersed in the silicate phase, a first diffraction peak attributed to the compound A and a second diffraction peak attributed to the silicon particles are observed around a diffraction angle 2θ=33° and 29°, respectively, in the X-ray diffraction pattern of the composite material. The second diffraction peak is a diffraction peak of the (111) plane of Si.

The ratio: I1/I2 of an intensity I1 of the first diffraction peak to an intensity I2 of the second diffraction peak is preferably 0.25 or less. In this case, the silicon particles and the crystal phase of the compound A are dispersed in a balanced manner in the silicate phase, tending to lead to a higher capacity of the negative electrode and an improved initial charge and discharge efficiency.

The diffraction peak attributed to the compound A depends on the crystal structure of the compound A. The diffraction peak attributed to the compound A includes a (20-2) plane, (122) plane. (113) plane. (03-2) plane, or (11-5) plane diffraction peak when the crystal structure is monoclinic, includes a (124) plane or (026) plane diffraction peak when the crystal structure is tetragonal, and includes a (203) plane diffraction peak when the crystal structure is triclinic.

The crystal phase of the compound A has an interplanar spacing at least of 2.6 Å to 2.75 Å, 3.6 Å to 3.7 Å, 5.2 Å to 5.3 Å, and 7.3 Å to 7.4 Å.

A description will be given below of the composite material.

In the silicate phase containing the element E1, as compared to in the $SiO_2$ phase of $SiO_x$, the sites that may react with lithium are small in number. Therefore, the composite material is less likely to generate irreversible capacity ding charge and discharge and is more excellent in the initial charge and discharge efficiency, as compared to $SiO_x$. Furthermore, since the content of silicon particles can be changed as desired, a high-capacity negative electrode can be designed.

The silicate phase of the element E1 can be formed into an amorphous or amorphous-like phase through a production method of a negative electrode material as described later. The crystallinity of the matrix of the silicate phase is preferably low, in view of improving the lithium ion conductivity of the composite particles, reducing the stress caused by the expansion and contraction of the silicon particles during charge and discharge, and suppressing cracks of the composite material particles. In the X-ray diffraction pattern of the composite material obtained by X-ray diffractometry using Cu-Kα radiation, the half-width of the diffraction peak of the (111) plane of the silicate of the element E1 is, for example, 0.05° or more, and may be 0.5° or more.

The silicate phase includes a silicate of the element E1. The element E1 includes at least one selected from an alkali metal element (Group 1 element other than hydrogen in the long periodic table) and a Group 2 element in the long periodic table. Examples of the alkali metal element include lithium (Li), potassium (K), and sodium (Na). Examples of the second group element include magnesium (Mg), calcium (Ca), and barium (Ba). These elements E1 may be used singly or in combination of two or more.

The silicate phase may further contain an element E2. Examples of the element E2 include zirconium (Zr), niobium (Nb), tantalum (Ta), vanadium (V), titanium (Ti), phosphorus (P), bismuth (Bi), zinc (Zn), tin (Sn), lead (Pb), antimony (Sb), cobalt (Co), fluorine (F), tungsten (W), aluminum (Al), and boron (B). These elements E2 may be used singly or in combination of two or more. When the silicate phase contains the element E2, the chemical stability, the lithium ion conductivity, and the like of the composite material can be improved. The side reaction that occurs when the silicate phase contacts the non-aqueous electrolyte can be suppressed. In terms of the chemical resistance to electrolyte and the structural stability, the element E2 is preferably at least one selected from the group consisting of Zr, Ti, P, Al, and B. The element E2 may be formed into a compound. The compound may be, for example, a silicate or an oxide of the element E2, depending on the kind of the element E2.

The silicate phase may further contain a small amount of other elements, such as iron (Fe), chromium (Cr), nickel (Ni), manganese (Mn), copper (Cu), and molybdenum (Mo).

The silicate phase includes, for example, a lithium silicate phase containing lithium (Li), silicon (Si), and oxygen (O). The atomic ratio: O/Si of O to Si in the lithium silicate phase is, for example, greater than 2 and less than 4. When the O/Si is greater than 2 and less than 4 (z in the formula below satisfies 0<z<2), it is advantageous in the stability and the lithium ion conductivity. The O/Si is preferably greater than 2 and less than 3 (z in the formula below satisfies 0<z<1). The atomic ratio: Li/Si of Li to Si in the lithium silicate phase is, for example, greater than 0 and less than 4.

The lithium silicate phase can have a composition represented by a formula: $Li_{2z}SiO_{2+z}$, where 0<z<2. In terms of the stability, the ease of production, and the lithium ion conductivity, z preferably satisfies 0<z<1, and is more preferably z=1/2.

The composition of the lithium silicate phase in the composite material can be analyzed, for example, by the following method.

First, the battery is dismantled, to take out the negative electrode, which is then washed with a non-aqueous solvent, such as ethylene carbonate, and dried. This is followed by processing with a cross section polisher (CP) to obtain a cross section of the negative electrode material mixture layer, thereby to obtain a sample. A field emission scanning electron microscope (FE-SEM) is used to give a reflected electron image of a sample cross section, to observe the cross section of a composite material particle. Then, an Auger electron spectroscopy (AES) analyzer (JAMP-9510F, available from JEOL Corporation) is used to perform a qualitative/quantitative analysis of elements in the silicate phase of the observed composite material particle (acceleration voltage: 10 kV, beam current: 10 nA, analysis area: 20 μmφ). For example, the composition of the silicate phase can be determined from the obtained contents of the element E1 (Li etc.), silicon(S), oxygen (O), and other elements. Each element in the composite material in a discharged state can be identified by energy-dispersive X-ray spectroscopy (EDX), electron microanalyzer (EPMA), laser ablation ICP mass spectrometry (LA-ICP-MS), X-ray photoelectron spectroscopy (XPS), or the like.

In the above cross-section observation and analysis of the sample, in order to prevent the diffusion of Li, a carbon specimen support can be used for fixing the sample. In order to prevent the quality alteration of the sample cross section, a transfer vessel that holds and conveys a sample without exposing the sample to air can be used.

The silicon particles dispersed in the lithium silicate phase have a particulate phase of silicon (Si) simple substance, and usually, are each composed of multiple crystallites. The silicon particles preferably has a crystallite size of 30 n or less. When the crystallite size of the silicon particles is 30 nm or less, the changes in volume of the silicon particles associated with expansion and contraction during charge and discharge can be reduced, and the cycle characteristics can be further improved. For example, the isolation of the silicon particle can be suppressed, which occurs in association with the contraction of the silicon particles, as voids are formed around the silicon particle and cause the contact points on the particle with the surrounding material to decrease. And the reduction in the charge and discharge efficiency due to the isolation of the particle can be suppressed. The lower limit of the crystallite size of the silicon particles is not specifically limited, but is, for example, 1 n or more.

The crystallite size of the silicon particles is more preferably 10 n or more and 30 nm or less, more preferably 15 nm or more and 25 nm or less. When the crystallite size of the silicon particles is 10 nm or more, the surface area of the silicon particles can be suppressed small, and the deterioration of the silicon particles accompanying the generation of irreversible capacity is unlikely to occur.

The crystallite size of the silicon particles can be calculated from the Scherrer formula, using the half-width of a diffraction peak attributed to the (111) plane of the silicon particle (Si simple substance) in an X-ray diffraction pattern.

The composite material is excellent also in structural stability. This is because silicon particles are dispersed in the lithium silicate phase, which can suppress the expansion and contraction of the composite material associated with charge and discharge. In view of suppressing the cracking of the silicon particles themselves, the average particle diameter of the silicon particles before the first charge is preferably 500 nm or less, more preferably 200 nm or less, still more preferably 50 m or less. After the first charge, the average particle diameter of the silicon particles is preferably 400 nm or less, more preferably 100 nm or less. By refining the silicon particles, the changes in volume during charge and discharge can be reduced, and the structural stability of the composite material can be further improved.

The average particle diameter of the silicon particles is measured by observing a cross-sectional SEM image of the composite material. Specifically, the average particle diameter of the silicon particles is obtained by averaging the maximum diameters of randomly selected 100 silicon particles.

In view of achieving a higher capacity, the content of silicon particles in the composite material is preferably 30 mass % or more, more preferably, 35 mass % or more, further more preferably 55 mass % or more. In this case, the lithium ions can diffuse favorably, making it easy to obtain excellent load characteristics. On the other hand, in view of improving the cycle characteristics, the content of silicon particles in the composite material is preferably 95 mass % or less, more preferably 75 mass % or less, further more preferably 70 mass % or less. In this case, the exposed surface area of the silicon particles without being covered with the silicate phase decreases, and the reaction between the non-aqueous electrolyte and the silicon particles tends to be suppressed.

The composite material is preferably in the form of particles. The composite material particles have an average diameter of, for example, 1 µm or more and 25 µm or less, and may be 4 µm or more and 15 µm or less. In this case, the stress due to changes in volume of the composite material during charge and discharge tends to be further reduced, and excellent cycle characteristics tend to be obtained. In addition, since the composite material particles can have an appropriate surface area, the decrease in capacity due to the side reaction with the non-aqueous electrolyte can be suppressed.

The average particle diameter of the composite material particles means a particle diameter at 50% cumulative volume (volume average particle diameter) in a particle diameter distribution measured by a laser diffraction and scattering method. For the measurement, for example, "LA-750", available from Horiba, Ltd. (HORIBA) can be used.

The surface of the composite material may be at least partially covered with an electrically conductive layer. This improves the conductivity of the composite material. The conductive layer is preferably thin enough not to substantially influence the average particle diameter of the composite material particles. The conductive layer has a thickness of preferably 1 nm or more and 200 nm or less, more preferably 5 nm or more and 100 nm or less, for securing the electrical conductivity and allowing for diffusion of lithium ions. The thickness of the conductive layer can be measured by cross-section observation of the composite material using a SEM or TEM.

[Method for Producing Negative Electrode Material]

A method for producing a negative electrode material includes, for example, a first step of obtaining a raw material silicate including an element E1 and a rare earth element, a second step of forming a composite of the raw material silicate and a raw material silicon, as a composite intermediate, in which silicon particles and a silicate containing the rare earth element are dispersed in a silicate phase containing the element E1, and a third step of subjecting the composite intermediate to heat treatment to enhance the crystallinity of the silicate containing the rare earth element, to obtain a composite material in which silicon particles and a crystal phase of the silicate containing the rare earth element are dispersed in the silicate phase containing the element E1.

[First Step]

The first step includes, for example, a step 1a of mixing silicon dioxide, a compound containing an element E1, and a compound containing a rare earth element, to obtain a mixture, and a step 1b of baking the mixture, to obtain a raw material silicate containing the element E1 and the rare earth element. The baking in the step 1b is performed, for example, in an oxidizing atmosphere. The baking temperature of the step 1b is preferably 400° C. or higher and 1200° C. or lower, more preferably 800° C. or higher and 1100° C. or lower. In the first step, a silicate containing an element E1, and a silicate containing a rare earth element may be separately prepared as the raw material silicate.

The compound containing the element E1 is, for example, a carbonate, an oxide, a hydroxide, or a hydride of the element E1. For example, it may be a lithium compound, such as lithium carbonate, lithium oxide, lithium hydroxide, and lithium hydride. These compounds containing the element E1 may be used singly or in combination of two or more.

The compound containing the rare earth element is, for example, an oxide, an oxalate, a nitrate, a sulfate, a halide, or a carbonate of the rare earth element. For example, it may be a lanthanum compound, such as lanthanum oxide. These compounds containing the rare earth element may be used singly or in combination of two or more.

[Second Step]

In the second step, a composite intermediate including a silicate phase containing the element E1, silicon particles dispersed in the silicate phase, and a silicate of the rare earth element dispersed in the silicate phase can be obtained. By appropriately adjusting the blending ratio of the compound containing the element E1 and the compound containing the rare earth element in the first step, in the composite intermediate, the silicate of the rare earth element can be dispersed together with the silicon particles, in the matrix of a silicate containing the element E1. In the second step, in the composite intermediate, a silicate containing the element E1 and a silicate of the rare earth element which are low in crystallinity can be formed.

In the second step, a silicate containing the element E1 and the rare earth element and a raw material silicon may be formed into a composite. A silicate containing the element E1, a silicate containing the rare earth element, and a raw material silicon may be formed into a composite.

The raw material silicon may be, for example, coarse particles of silicon having an average particle diameter of about several µm to several tens µm. The crystallite size of the finally obtained silicon particles as calculated from the Scherrer formula from a half-width of a diffraction peak attributed to the Si (111) plane of the X-ray diffraction pattern is preferably controlled to be 10 nm or more.

The second step includes, for example, a step 2a of pulverizing the mixture of the raw material silicate and a raw material silicon while applying a shear force to the mixture, to obtain a fine particulate mixture, and a step 2b of baking the fine particulate mixture, to obtain a composite intermediate. In the composite intermediate thus obtained, the silicate of the element E1 and the silicate of the rare earth element have low crystallinity.

In the step 2a, for example, the raw material silicate and a raw material silicon are mixed at a predetermined mass ratio, and the mixture is stirred while being crushed into fine particles, using a pulverizer like a ball mill. The step 2a, however, is not limited thereto. For example, without using a pulverizer, silicon nanoparticles and raw material silicate nanoparticles may be synthesized separately and then mixed.

In the step 2b, a sintered body (composite intermediate) of the mixture may be produced by baking the mixture while applying a pressure to the mixture with a hot press or the like. The sintered body may be then pulverized into a granular material, which can be used as particles of a composite intermediate. By appropriately selecting the pulverizing conditions, particles of a composite intermediate having an average particle diameter of 1 to 25 µm can be obtained.

The baking in the step 2b is performed, for example, in an inert atmosphere (e.g., an atmosphere of argon or nitrogen). The baking temperature in the step 2b is preferably 450° C. or higher and 1000° C. or lower. In the temperature range as above, fine silicon particles can be easily dispersed in the silicate phase with low crystallinity. Furthermore, the raw material silicate is stable within the temperature range as above, and hardly reacts with silicon. Therefore, a capacity decrease, if any, is very small.

In the first step or the second step, a compound containing an element E2 may be further added. The compound containing the element E2 may be, for example, an oxide, an oxalate, a nitrate, a sulfate, a halide, or a carbonate of the element E2. In particular, an oxide is preferable because of its stability and favorable ion conductivity. These compounds containing the element E2 may be used singly or in combination of two or more.

[Third Step]

In the third step, the composite intermediate is subjected to a predetermined heat treatment. This improves the crystallinity of the silicate of the rare earth element dispersed in the silicate phase, forming a crystal phase of the silicate of the rare earth element. Since the rare earth element is forming an ionic bond by severing the silicate skeleton, the heat treatment can easily form a rare earth silicate with stable crystallinity.

The heat treatment temperature is preferably 550° C. or higher and 900° C. or lower, more preferably 650° C. or higher and 850° C. or lower. When the heat treatment temperature is 550° C. or higher, a crystal phase of the silicate of the rare earth element is easily formed. When the heat treatment temperature is 900° C. or lower, the crystallinity of the silicate phase of the element E1 tends to be maintained low, and the silicon particles dispersed in the silicate phase tend to be maintained small in size. The heat treatment time is, for example, 1 hour or more and 10 hours or less. The heat treatment may be performed in an oxidizing atmosphere or in an inert atmosphere.

[Fourth Step]

The method of producing a negative electrode material may further include a fourth step of forming a conductive layer containing an electrically conductive material on at least part of the surface of the composite material. The conductive material preferably has electrochemical stability, and is preferably a carbon material. The conductive layer can be formed on the surface of the composite material by, for example, mixing a coal pitch, a petroleum pitch, a phenol resin or the like with the composite material particles, and heating them to be carbonized. The heating for carbonization may also serve as the heat treatment in the third step. With a CVD method using a hydrocarbon gas, such as acetylene or methane, as a raw material, a conductive layer containing a carbon material may be formed on the surface of the composite material particles. Carbon black may be allowed to adhere to the surface of the composite material particles.

[Fifth Step]

The method of producing a negative electrode material may further include a fifth step of washing the composite material with an acid. For example, by washing the composite material containing a lithium silicate with an acidic aqueous solution, a trace amount of a component, such as $Li_2SiO_3$, which may be produced when the raw material silicon and the lithium silicate are formed into a composite can be dissolved and removed. Examples of the acidic aqueous solution include: an aqueous solution of an inorganic acid, such as hydrochloric acid, hydrofluoric acid, sulfuric acid, nitric acid, phosphoric acid, and carbonic acid- and an aqueous solution of an organic acid, such as citric acid and acetic acid.

In the following, an example of a negative electrode material for a non-aqueous electrolyte secondary battery according to an embodiment of the present invention will be described below with reference to FIG. 1. FIG. 1 is a schematic cross-sectional view of a negative electrode material (a composite material 11).

The composite material 11 is in the form of particles, and includes a silicate phase 12 of the element E1, silicon (Si simple substance) particles 13 dispersed in the silicate phase 12, and a crystal phase 14 of a silicate of a rare earth element dispersed in the silicate phase 12. As illustrated in FIG. 1, at least part of the surface of the particle of the composite material 11 may be covered with a conductive layer 15 containing an electrically conductive material.

The composite material 11 has, for example, a sea-island structure, and in a cross section thereof, the fine silicon particles 13 and the crystal phase 14 are substantially uniformly scattered without being localized, in the matrix of the silicate phase 12. The crystal phase 14 is mostly larger in size than the silicon particles 13.

The silicate phase 12 is preferably composed of particles finer than the silicon particles 13. In this case, in an X-ray diffraction pattern of the negative electrode material, the intensity of a diffraction peak attributed to the (111) plane of Si simple substance is higher than that of the silicate of the element E1.

The silicate phase 12 may further contain an element E2. The silicate phase 12 may slightly contain $SiO_2$ like a natural oxide film formed on the surface of the silicon particles.

[Non-Aqueous Electrolyte Secondary Battery]

A non-aqueous electrolyte secondary battery according to an embodiment of the present invention includes a positive electrode, a negative electrode, and a non-aqueous electrolyte. The negative electrode includes the above-described negative electrode material for a non-aqueous electrolyte secondary battery.

A detailed description of the non-aqueous electrolyte secondary battery will be given below.

[Negative Electrode]

The negative electrode may include a negative electrode current collector, and a negative electrode material mixture layer supported on a surface of the negative electrode current collector. The negative electrode material mixture layer can be formed by applying a negative electrode slurry including a negative electrode material mixture dispersed in a dispersion medium, onto a surface of the negative electrode current collector, followed by drying. The applied film after drying may be rolled, if necessary. The negative electrode material mixture layer may be formed on one surface or both surfaces of the negative electrode current collector.

The negative electrode material mixture includes a negative electrode active material as an essential component, and can include a binder, a conductive agent, a thickener or the like as an optional component. The aforementioned negative electrode material (composite material) is used as the negative electrode active material.

The negative electrode active material preferably further includes a carbon material that electrochemically absorbs and releases lithium ions. The composite material expands and contracts in volume in association with charge and discharge. Therefore, increasing the ratio thereof in the negative electrode active material may cause a contact failure, in association with charge and discharge, between the negative electrode active material and the negative electrode current collector. However, by using the composite material and a carbon material in combination, excellent cycle characteristics can be achieved, while a high capacity of the silicon particles can be imparted to the negative electrode. In view of achieving a high capacity and improving the cycle characteristics, the ratio of the carbon material to the total of the silicon-containing material and the carbon material is preferably, for example, 98 mass % or less, more preferably 70 mass % or more and 98 mass % or less, still more preferably 75 mass % or more and 95 mass % or less.

Examples of the carbon material include graphite, graphitizable carbon (soft carbon), and non-graphitizable carbon (hard carbon). Preferred among them is graphite, which is stable during charge and discharge and whose irreversible capacity is small. The graphite means a material having a graphite-like crystal structure, examples of which include natural graphite, artificial graphite, and graphitized mesophase carbon particles. These carbon materials may be used singly or in combination of two or more kinds.

Examples of the negative electrode current collector include a non-porous electrically conductive substrate (e.g., metal foil) and a porous electrically conductive substrate (e.g., mesh, net, punched sheet). The negative electrode current collector may be made of, for example, stainless steel, nickel, a nickel alloy, copper, or a copper alloy. The negative electrode current collector may have any thickness. In view of the balance between strength and lightweight of the negative electrode, the thickness is preferably 1 to 50 µm, more preferably 5 to 20 µm.

The binder may be a resin material, examples of which include: fluorocarbon resin, such as polytetrafluoroethylene and polyvinylidene fluoride (PVDF): polyolefin resin, such as polyethylene and polypropylene; polyamide resin, such as aramid resin; polyimide resin, such as polyimide and polyamide-imide; acrylic resin, such as polyacrylic acid, polymethyl acrylate, and ethylene-acrylic acid copolymer; vinyl resin, such as polyacrylonitrile and polyvinyl acetate; polyvinyl pyrrolidone; polyether sulfone; and a rubbery material, such as styrene-butadiene copolymer rubber (SBR). These binders may be used singly or in combination of two or more kinds.

Examples of the conductive agent include: carbons, such as acetylene black; conductive fibers, such as carbon fibers and metal fibers; fluorinated carbon; metal powders, such as aluminum; conductive whiskers, such as zinc oxide and potassium titanate; conductive metal oxides, such as titanium oxide; and organic conductive materials, such as phenylene derivatives. These conductive agents may be used singly or in combination of two or more kinds.

Examples of the thickener include: cellulose derivatives (e.g., cellulose ether), such as carboxymethyl cellulose (CMC) and modified products thereof (including salts such as Na salt), and methyl cellulose; saponificated products of a polymer having a vinyl acetate unit, such as polyvinyl alcohol; and polyether (e.g., polyalkylene oxide, such as polyethylene oxide). These thickeners may be used singly or in combination of two or more kinds.

Although not particularly limited, examples of the dispersion medium include: water; alcohols, such as ethanol; ethers, such as tetrahydrofiran; amides, such as dimethylformamide; N-methyl-2-pyrrolidone (NMP); and a mixed solvent of these.

[Positive Electrode]

The positive electrode may include a positive electrode current collector, and a positive electrode material mixture layer supported on a surface of the positive electrode current collector. The positive electrode material mixture layer can be formed by applying a positive electrode slurry including a positive electrode material mixture dispersed in a dispersion medium, onto a surface of the positive electrode current collector, followed by drying. The applied film after drying may be rolled, if necessary. The positive electrode material mixture includes a positive electrode active material as an essential component, and can include a binder, a conductive agent, or the like as an optional component. The dispersion medium of the positive electrode slurry may be NMP or the like.

The positive electrode active material may be, for example, a lithium-containing composite oxide. Examples thereof include $Li_aCoO_2$, $Li_aNiO_2$, $Li_aMnO_2$, $Li_aCO_bNi_{1-b}O_2$, $Li_aCo_bMe_{1-b}O_c$, $Li_aNi_{1-b}Me_bO_c$, $Li_aMn_2O_4$, $Li_aMm_{2-b}Me_bO_4$, $LiMePO_4$, and $Li_2MePO_4F$, where Me is at least one selected from the group consisting of Na, Mg, Sc, Y, Mn, Fe, Co, Ni, Cu, Zn, Al, Cr, Pb, Sb, and B. Here, a=0 to 1.2, b=0 to 0.9, and c=2.0 to 2.3. The value "a" representing the molar ratio of lithium is subjected to increase and decrease during charge and discharge.

Preferred is a lithium-nickel composite oxide represented by $Li_aNi_bMe_{1-b}O_2$, where Me is at least one selected from the group consisting of Mn, Co, and Al, $0<a\leq1.2$, and $0.3\leq b\leq1$. In view of achieving a higher capacity, b preferably satisfies $0.85\leq b\leq1$. In view of the stability of the crystal structure, more preferred is $Li_aNi_bCo_cAl_dO_2$ containing Co and Al as elements represented by Me, where $0<a\leq1.2$, $0.85\leq b<1$, $0<c<0.15$, $0<d\leq0.1$, and b+c+d=1.

The binder and the conductive agent may be like those exemplified for the negative electrode. The conductive agent may be graphite, such as natural graphite and artificial graphite.

The form and the thickness of the positive electrode current collector may be respectively selected from the forms and the ranges corresponding to those of the negative electrode current collector. The positive electrode current collector may be made of, for example, stainless steel, aluminum, an aluminum alloy, or titanium.

[Non-Aqueous Electrolyte]

The non-aqueous electrolyte contains a non-aqueous solvent, and a lithium salt dissolved in the non-aqueous solvent. The concentration of the lithium salt in the non-aqueous electrolyte is preferably, for example, 0.5 mol/L or more and 2 mol/L or less. By controlling the lithium salt concentration within the above range, a non-aqueous electrolyte having excellent ion conductivity and moderate viscosity can be obtained. The lithium salt concentration, however, is not limited to the above.

Examples of the non-aqueous solvent include cyclic carbonic acid esters, chain carbonic acid esters, cyclic carboxylic acid esters, and chain carboxylic acid esters. The cyclic carbonic acid esters are exemplified by propylene carbonate (PC) and ethylene carbonate (EC). The chain carbonic acid esters are exemplified by diethyl carbonate (DEC), ethyl methyl carbonate (EMC), and dimethyl carbonate (DMC). The cyclic carboxylic acid esters are exemplified by γ-butyrolactone (GBL) and γ-valerolactone (GVL). The chain carboxylic acid esters are exemplified by methyl formate, ethyl formate, propyl formate, methyl acetate, ethyl acetate, propyl acetate, methyl propionate, ethyl propionate, and propyl propionate. These non-aqueous solvents may be used singly or in combination of two or more kinds.

Examples of the lithium salt include: $LiClO_4$, $LiBF_4$, $LiPF_6$, $LiAlCl_4$, $LiSbF_6$, $LiSCN$, $LiCF_3SO_3$, $UCF_3CO_2$, $LiAsF_6$, $LiB_{10}Cl_{10}$, lithium lower aliphatic carboxylate, LiCl, LiBr, LiI, borates, and imides. Examples of the borates include lithium bis(1,2-benzenediolate(2-)-O,O') borate, lithium bis(2,3-naphthalenediolate(2-)-O,O') borate, lithium bis(2,2'-biphenyldiolate(2-)-O,O') borate, lithium bis(5-fluoro-2-olate-1-benzenesulfonate-O,O') borate. Examples of the imides include lithium bisfluorosulfonyl imide (LiN(FSO$_2$)$_2$), lithium bis(trifluoromethanesulfonyl)imide (LiN(CF$_3$SO$_2$)$_2$), lithium trifluoromethanesulfonyl nonafluorobutanesulfonyl imide (LiN(CF$_3$SO$_2$)(C$_4$F$_9$SO$_2$)), and lithium bis(pentafluoroethanesulfonyl)imide (LiN(C$_2$F$_5$SO$_2$)$_2$). Preferred among them is LiPF$_6$. LiPF$_6$ is likely to form a passivation film on a surface of a constituent member of a battery, such as a positive electrode current collector. The passivation film serves to protect the above member. These lithium salts may be used singly or in combination of two or more kinds

[Separator]

Usually, it is desirable to interpose a separator between the positive electrode and the negative electrode. The separator is excellent in ion permeability and has moderate mechanical strength and electrically insulating properties. The separator may be, for example, a microporous thin film, a woven fabric, or a nonwoven fabric. The separator is preferably made of, for example, polyolefin, such as polypropylene or polyethylene.

In an exemplary structure of the non-aqueous electrolyte secondary battery, an electrode group formed by winding the positive electrode and the negative electrode with the separator interposed therebetween is housed together with the non-aqueous electrolyte in an outer case. The wound-type electrode group may be replaced with a different form of the electrode group, for example, a stacked-type electrode group formed by stacking the positive electrode and the negative electrode with the separator interposed therebetween. The non-aqueous electrolyte secondary battery may be in any form, such as cylindrical type, prismatic type, coin type, button type, or laminate type.

Figure 2:
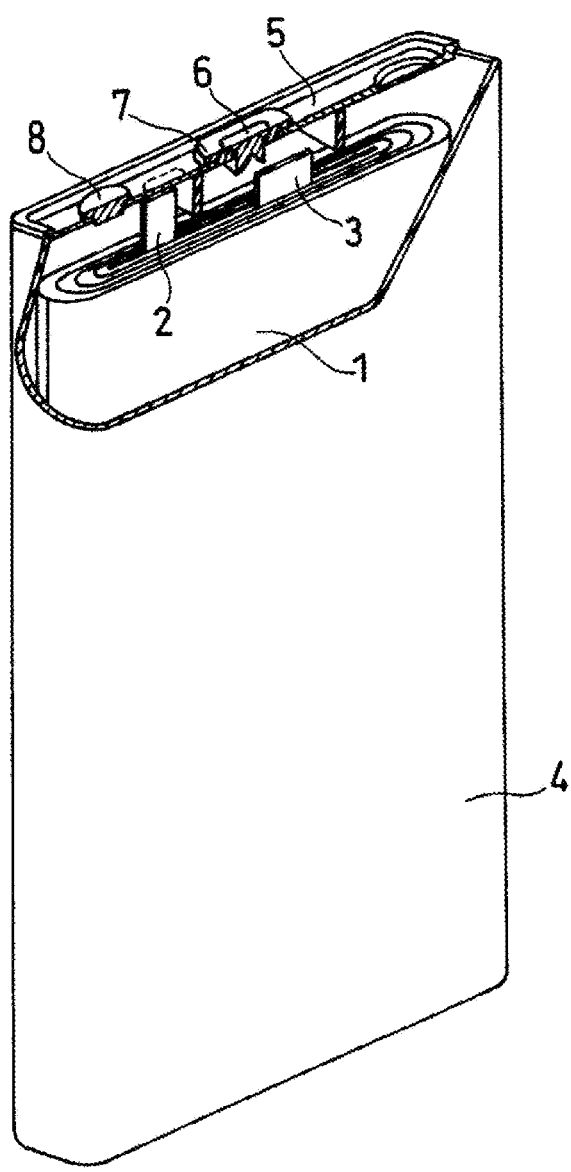
FIG. 2 A partially cut-away schematic oblique view of a non-aqueous electrolyte secondary battery according to one embodiment of the present invention.

In the following, a structure of a prismatic non-aqueous electrolyte secondary battery which is an example of a non-aqueous electrolyte secondary battery according to the present invention will be described with reference to FIG. 2. FIG. 2 is a partially cut-away schematic oblique view of a non-aqueous electrolyte secondary battery according to an embodiment of the present invention.

The battery includes a bottomed prismatic battery case 4, and an electrode group 1 and a non-aqueous electrolyte (not shown) housed in the battery case 4. The electrode group 1 has a long negative electrode, a long positive electrode, and a separator interposed therebetween and preventing them from directly contacting with each other. The electrode group 1 is formed by winding the negative electrode, the positive electrode, and the separator around a flat plate-like winding core, and then removing the winding core.

A negative electrode lead 3 is attached at its one end to the negative electrode current collector of the negative electrode, by means of welding or the like. The negative electrode lead 3 is electrically connected at its other end to a negative electrode terminal 6 disposed at a sealing plate 5, via a resin insulating plate (not shown). The negative electrode terminal 6 is electrically insulated from the sealing plate 5 by a resin gasket 7. A positive electrode lead 2 is attached at its one end to the positive electrode current collector of the positive electrode, by means of welding or the like. The positive electrode lead 2 is electrically connected at its other end, via an insulating plate, to the backside of the sealing plate 5. In other words, the positive electrode lead 2 is electrically connected to the battery case 4 serving as a positive electrode terminal. The insulating plate insulates the electrode group 1 from the sealing plate 5, and insulates the negative electrode lead 3 from the battery case 4. The sealing plate 5 is fitted at its periphery to the opening end of the battery case 4, and the fitted portion is laser-welded. In this way, the opening of the battery case 4 is sealed with the sealing plate 5. The electrolyte injection hole provided in the sealing plate 5 is closed with a sealing stopper 8.

The present invention will be specifically described below with reference to Examples and Comparative Examples. It is to be noted, however, that the present invention is not limited to the following Examples.

Examples 1 to 4 and Comparative Examples 1 to 5

[Preparation of Negative Electrode Material]
[First Step]

Silicon dioxide and a compound containing an element X were mixed, and the resultant mixture was baked at 950° C. for 10 hours. In this way, a silicate containing the element X was obtained. The obtained silicate was pulverized to have an average particle diameter of 10 μm.

The element X used here are shown in Table 1. When Li, Na, and K were used as the element X, Li$_2$CO$_3$, Na$_2$CO$_3$, and K$_2$CO$_3$ were mixed as the compound containing an element X. When Ca and Mg were used as the element X, CaCO$_3$ and MgCO$_3$ were mixed as the compound containing an element X. When P, B, Al, and La were used as the element X, P$_2$O$_5$, B$_2$O$_3$, Al$_2$O$_3$, and La$_2$O$_3$ were mixed as the compound containing an element X.

The amount of the compound containing the element X was adjusted to give a negative electrode material in the third step in which the content of the element X was as shown in Table 1. The content of the element X in the negative electrode material in Table 1 is a mass ratio to the total mass of the elements other than oxygen.

[Second Step]

The silicate containing the element X and a raw material silicon (3N, average particle diameter: 10 μm) were mixed. In the mixture, the mass ratio of the silicate to the raw material silicon was set to 40:60.

The mixture was placed in a pot (made of SUS, volume: 500 mL) of a planetary ball mill (P-5, available from Fritsch Co., Ltd.), together with 24 SUS balls (diameter: 20 mm). In the pot with the lid closed, the mixture was pulverized at 200 rpm for 50 hours in an inert atmosphere.

Next, the powdered mixture was taken out from the pot in an inert atmosphere, which was then baked at 600° C. for 4 hours, in an inert atmosphere, with a pressure applied by a hot press, to give a sintered body of the mixture (a composite intermediate). The resultant composite intermediate was pulverized and passed through a 40-μm mesh, to give particles of the composite intermediate.

[Third Step]

In Examples 1 to 4 and Comparative Examples 2 to 5, the particles of the composite intermediate were subjected to a predetermined heat treatment in an inert atmosphere, to enhance the crystallinity of La$_2$Si$_2$O$_7$ dispersed in the particles of the composite intermediate, thereby to form composite material particles. Then, the composite material particles were sieved to an average particle diameter of 5 μm. Negative electrode materials a1 to a4 and b2 to b5 were thus produced.

In Comparative Example 1, the particles of the composite intermediate were not subjected to the above heat treatment (third step), and were sieved to an average particle diameter of 5 μm. A negative electrode material b1 was thus produced.

[Analysis of Negative Electrode Material]

In all the negative electrode materials, the crystallite size of the silicon particles in the composite material as determined by the already mentioned method was 15 nm. For example, in the negative electrode material a1, the content of silicon (the total of silicon contained in the silicon particles and the silicate phase) in the composite material as determined by the already mentioned method was 93.3 mass %.

Analysis by X-ray diffractometry and electron beam diffractometry confirmed that, in the negative electrode materials a1 to a4, a crystal phase represented by $La_2Si_2O_7$ was formed. In the X-ray diffraction pattern obtained by X-ray diffractometry using Cu-Kα radiation (hereinafter, an XRD pattern) of the negative electrode materials a1 to a4, a diffraction peak was observed around a diffraction angle 2=26°. 27° 0.28°, and 33°. The half-value width of the diffraction peak around the diffraction angle 2θ=33° was 0.75° or less. The interplanar spacing as determined based on the data of the diffraction spot obtained by electron beam diffractometry was 2.6 Å to 2.75 Å, 3.6 Å to 3.7 Å, 5.2 Å to 5.3 Å, and 7.3 Å to 7.4 Å.

The cross-sectional SEM image (reflected electron image) of the negative electrode materials a1 to a4 showed that the crystal phase of $La_2Si_2O_7$ was dispersed in the matrix of the silicate phase. The equivalent circle diameter of the crystal phase of $La_2Si_2O_7$ as determined by the already mentioned method was 10 nm or more and 1.0 μm or less.

In the negative electrode materials a1 to a4 in the XRD pattern, a first diffraction peak belonging to $La_2Si_2O_7$ and a second diffraction peak belonging to the silicon particles were confirmed around a diffraction angle 2θ=33° and 29°, respectively. The ratio: I1/I2 of an intensity I1 of the first diffraction peak to an intensity I2 of the second diffraction peak was 0.25 or less.

In the negative electrode material b1, in the XRD pattern, a diffraction peak belonging to $La_2Si_2O_7$ was confirmed around a diffraction angle 2θ=26°, 27°, 28° and 33°. In the negative electrode material b1, however, the half-width of the diffraction peak around the diffraction angle 26=33° was as wide as 1.0°, showing that the crystallinity of the $La_2Si_2O_7$ phase was low.

In the negative electrode materials b2 to b5, no diffraction peak attributed to $LaSi_2O_7$ was observed in the XRD pattern.

[Production of Negative Electrode]

The negative electrode material was mixed with graphite in a mass ratio of 5:95, which was used as a negative electrode active material. The negative electrode active material was mixed with sodium carboxymethyl cellulose (CMC-Na) and styrene-butadiene rubber (SBR) in a mass ratio of 97.5:1:1.5, to which water was added. The mixture was stirred in a mixer (T.K. HIVIS MIX, available from PRIMIX Corporation), to prepare a negative electrode slurry. Next, the negative electrode slurry was applied onto copper foil, so that the mass of a negative electrode material mixture per 1 m² of the copper foil was 190 g. The applied film was dried, and then rolled, to give a negative electrode with a negative electrode material mixture layer having a density of 1.5 g/cm³ formed on both surfaces of the copper foil.

[Production of Positive Electrode]

Lithium cobaltate, acetylene black, and polyvinylidene fluoride were mixed in a mass ratio of 95:2.5:2.5, to which N-methyl-2-pyrrolidone (NMP) was added. The mixture was stirred in a mixer (T.K. HIVIS MIX, available from PRIMIX Corporation), to prepare a positive electrode slurry. Next, the positive electrode slurry was applied onto aluminum foil. The applied film was dried, and then rolled, to give a positive electrode with a positive electrode material mixture layer having a density of 3.6 g/cm³ formed on both surfaces of the aluminum foil.

[Preparation of Non-Aqueous Electrolyte]

$LiPF_6$ was dissolved at a concentration of 1.0 mol/L in a mixed solvent containing ethylene carbonate (EC) and diethyl carbonate (DEC) in a volume ratio of 3:7, to prepare a non-aqueous electrolyte.

[Fabrication of Non-Aqueous Electrolyte Secondary Battery]

The positive electrode and the negative electrode, with a tab attached to each electrode, were wound spirally with a separator interposed therebetween such that the tab was positioned at the outermost layer, thereby to form an electrode group. The electrode group was inserted into an outer case made of aluminum laminated film and dried under vacuum at 105° C. for two hours. The non-aqueous electrolyte was injected into the case, and the opening of the outer case was sealed. A battery was thus fabricated.

In the fabrication of the negative electrode, the negative electrode materials a1 to a4 and b1 to b5 were used to fabricate batteries A1 to A4 of Examples 1 to 4 and batteries B1 to B5 of Comparative Examples 1 to 5, respectively. The following cycle test was performed for each of the batteries.

[Cycle Test]

<Charge>

A constant-curent charge was performed at a current of 1 It (800 mA) until the voltage reached 4.2V, and then a constant-voltage charge was performed at a voltage of 4.2 V until the current reached 1/20 It (40 mA).

<Discharge>

A constant-current discharge was performed at 1 It (800 mA) until the voltage reached 2.75V.

The rest time between charge and discharge was 10 minutes. The charge and discharge were performed in a 25° C. environment.

For each battery, the discharge capacity at the 1st cycle to the charge capacity at the 1st cycle was measured as an initial charge and discharge efficiency. The initial charge and discharge efficiency was represented by a relative value, with the value of the initial charge and discharge efficiency of the battery B1 of Comparative Example 1 taken as 100.

In addition, for each battery, the ratio of the discharge capacity at the 100th cycle to the discharge capacity at the 1st cycle was measured as a cycle capacity retention ratio. The cycle capacity retention ratio was represented by a relative value, with the value of the cycle capacity retention ratio in the battery B1 of Comparative Example 1 taken as 100.

The evaluation results are shown in Table 1.

TABLE 1

| | Battery | Negative electrode material | Content of each element in negative electrode material (mass %) | | | | | | | | | | $La_2Si_2O_7$ crystal phase | Initial charge and discharge efficiency (index) | Cycle capacity retention ratio (index) |
| | | | Si | Li | Na | K | Ca | Mg | P | B | Al | La | | | |
| --- | --- | --- | --- | --- | --- | --- | --- | --- | --- | --- | --- | --- | --- | --- | --- |
| | | | | | | Element X | | | | | | | | | |
| Ex. 1 | A1 | a1 | 93.3 | 2.4 | — | — | 0.5 | 0.3 | — | 0.3 | 0.7 | 2.5 | With | 111 | 107 |
| Ex. 2 | A2 | a2 | 89.3 | 2.1 | — | — | 0.3 | — | — | 0.3 | 1.4 | 6.5 | With | 116 | 110 |

TABLE 1-continued

| | Battery | Negative electrode material | Content of each element in negative electrode material (mass %) | | | | | | | | | | La$_2$Si$_2$O$_7$ crystal phase | Initial charge and discharge efficiency (index) | Cycle capacity retention ratio (index) |
|---|---|---|---|---|---|---|---|---|---|---|---|---|---|---|---|
| | | | Si | Li | Na | K | Ca | Mg | P | B | Al | La | | | |
| | | | | | | | Element X | | | | | | | | |
| Ex. 3 | A3 | a3 | 84.4 | — | 3.8 | 5.0 | 0.4 | 0.2 | 0.3 | — | 0.5 | 5.3 | With | 116 | 109 |
| Ex. 4 | A4 | a4 | 87.2 | 2.0 | — | — | 0.4 | 0.3 | — | 0.2 | 0.6 | 9.2 | With | 126 | 110 |
| Com. Ex. 1 | B1 | b1 | 89.5 | 2.2 | — | — | 0.5 | 0.3 | — | 0.3 | 0.6 | 6.6 | Without | 100 | 100 |
| Com. Ex. 2 | B2 | b2 | 88.6 | — | 4.4 | 5.7 | 0.4 | — | 0.3 | — | 0.6 | — | Without | 100 | 102 |
| Com. Ex. 3 | B3 | b3 | 92.1 | 1.1 | 5.1 | — | 0.5 | 0.3 | — | 0.3 | 0.7 | — | Without | 100 | 102 |
| Com. Ex. 4 | B4 | b4 | 92.1 | 1.1 | 5.1 | — | 0.5 | 0.3 | — | 0.3 | 0.7 | — | Without | 100 | 105 |
| Com. Ex. 5 | B5 | b5 | 95.5 | 2.4 | — | — | 0.6 | 0.3 | 0.4 | — | 0.7 | — | Without | 100 | 102 |

In the batteries A1 to A4 of Examples 1 to 4, the initial charge and discharge efficiency was high, as compared to in the batteries B1 to B5 of Comparative Examples 1 to 5. In the batteries A1 to A4, the cycle capacity retention ratio was also high.

In the battery B1, due to the low crystallinity of La$_2$Si$_2$O$_7$ dispersed in the silicate phase, the initial charge and discharge efficiency was low. In the batteries B2 to B5 including the negative electrode materials b2 to b5 not containing the La$_2$Si$_2$O$_7$ crystal phase, the initial charge and discharge efficiency was low.

INDUSTRIAL APPLICABILITY

The non-aqueous electrolyte secondary battery according to the present invention is useful as a main power source for mobile communication equipment, portable electronic equipment, and other devices.

REFERENCE SIGNS LIST 1 electrode group
2 positive electrode lead
3 negative electrode lead
4 battery case
5 sealing plate
6 negative electrode terminal
7 gasket
8 sealing stopper
11 composite material
12 silicate phase of element E1
13 silicon particle
14 crystal phase of silicate of rare earth element
15 conductive layer

The invention claimed is:

1. A negative electrode material for a non-aqueous electrolyte secondary battery, comprising:
    a composite material comprising a silicate phase; silicon particles dispersed in the silicate phase; and a crystal phase dispersed in the silicate phase,
    the silicate phase containing at least one element E1 selected from the group consisting of alkali metal elements and Group 2 elements,
    the crystal phase containing a rare earth element, silicon, and oxygen,
    wherein a content of the silicon particles in the composite material relative to a mass of the composite material is 35 mass % or more.

2. The negative electrode material for a non-aqueous electrolyte secondary battery according to claim 1, wherein a content of the rare earth element is 0.2 mass % or more and 21 mass % or less, relative to a total mass of the elements other than oxygen.

3. The negative electrode material for a non-aqueous electrolyte secondary battery according to claim 1, wherein the rare earth element includes at least one selected from the group consisting of lanthanum, cerium, praseodymium, and neodymium.

4. The negative electrode material for a non-aqueous electrolyte secondary battery according to claim 1, wherein
    the crystal phase includes a compound A represented by a general formula: M$_2$Si$_2$O$_7$, and
    the M is a rare earth element.

5. The negative electrode material for a non-aqueous electrolyte secondary battery according to claim 4, wherein an X-ray diffraction pattern obtained by an X-ray diffractometry using Cu-Kα radiation has a diffraction peak attributed to the compound A, around a diffraction angle 2θ=26°, 27°, 28° and 33°.

6. The negative electrode material for a non-aqueous electrolyte secondary battery according to claim 4, wherein
    an X-ray diffraction pattern obtained by an X-ray diffractometry using Cu-Kα radiation has a first diffraction peak attributed to the compound A around a diffraction angle 2θ=33° and a second diffraction peak attributed to the silicon particles around a diffraction angle 2θ=29°, and
    a ratio: I1/I2 of an intensity I1 of the first diffraction peak to an intensity I2 of the second diffraction peak is 0.25 or less.

7. The negative electrode material for a non-aqueous electrolyte secondary battery according to claim 4, wherein the crystal phase has a crystal structure including at least one selected from the group consisting of monoclinic, tetragonal, and triclinic crystal structures.

8. The negative electrode material for a non-aqueous electrolyte secondary battery according to claim 4, wherein the crystal phase has an interplanar spacing at least of 2.6 Å to 2.75 Å, 3.6 Å to 3.7 Å, 5.2 Å to 5.3 Å, and 7.3 Å to 7.4 Å.

9. The negative electrode material for a non-aqueous electrolyte secondary battery according to claim 1, wherein the element E1 includes at least one selected from the group consisting of lithium, sodium, potassium, magnesium, calcium, and barium.

10. The negative electrode material for a non-aqueous electrolyte secondary battery according to claim 1, wherein
    the silicate phase further contains an element E2, and
    the element E2 includes at least one selected from the group consisting of zirconium, niobium, tantalum, vanadium, titanium, phosphorus, bismuth, zinc, tin, lead, antimony, cobalt, fluorine, tungsten, aluminum, and boron.

11. A non-aqueous electrolyte secondary battery, comprising:
   a positive electrode; a negative electrode; and a non-aqueous electrolyte,
   the negative electrode including the negative electrode material according to claim 1.

* * * * *